(12) United States Patent
Vawter

(10) Patent No.: US 7,748,618 B2
(45) Date of Patent: Jul. 6, 2010

(54) SECURE NEAR FIELD TRANSACTION

(75) Inventor: Jamison Vawter, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 989 days.

(21) Appl. No.: 11/465,935

(22) Filed: Aug. 21, 2006

(65) Prior Publication Data

US 2008/0041937 A1  Feb. 21, 2008

(51) Int. Cl.
*G06K 5/00* (2006.01)
*G06K 15/00* (2006.01)
*G06Q 20/00* (2006.01)

(52) U.S. Cl. ............... 235/380; 235/375; 235/383; 235/451; 235/487; 235/492; 705/64; 705/65; 705/66; 705/67; 705/72

(58) Field of Classification Search ............ 235/375, 235/380, 383, 451, 492, 487; 705/64–67, 705/72
See application file for complete search history.

(56) References Cited

U.S. PATENT DOCUMENTS

| | | | |
|---|---|---|---|
| 2002/0113120 A1* | 8/2002 | Yajima | 235/375 |
| 2002/0152178 A1* | 10/2002 | Lee | 705/67 |
| 2002/0170961 A1* | 11/2002 | Dickson et al. | 235/383 |
| 2004/0140352 A1* | 7/2004 | Walker et al. | 235/383 |
| 2005/0171898 A1* | 8/2005 | Bishop et al. | 705/39 |
| 2005/0187882 A1* | 8/2005 | Sovio et al. | 705/64 |
| 2006/0175403 A1* | 8/2006 | McConnell et al. | 235/385 |

* cited by examiner

*Primary Examiner*—Thien M. Le
*Assistant Examiner*—Tuyen K Vo

(57) ABSTRACT

A managed service for a near field transaction that may include a server to register a wireless device with the managed service, provide authentication information to the wireless device for use in establishing an identity of the wireless device. The server may provide authorization information to a register on behalf of the wireless device to establish the identity to the register, where the identity, when valid, allows the wireless device to participate in the near field transaction via a secure near field communication session with the register, receive transaction information from the register or the wireless device, and store the transaction information with a transaction identifier, where the transaction identifier is used to recall the transaction information on behalf of the register or the wireless device.

26 Claims, 14 Drawing Sheets

| STORE ID: FAIRFAX, VA | | | STORE LOCATION: 007 BOND PLAZA | |
|---|---|---|---|---|
| DATE: 5/15/2006 0930 | | | TRANSACTION #: 001 | |
| ITEM ID | QUANTITY | PRICE | DESCRIPTION | COMMENTS |
| MILK | 1 | $2.99 | 2%, 1 GALLON | |
| COOLER | 1 | $15.00 | 24 QUART, IGLOO | FOR VACATION |
| YOGURT | 5 | $0.75 | DANNON, 4OZ | FOR SCHOOL |
| ■ ■ ■ | ■ ■ ■ | ■ ■ ■ | ■ ■ ■ | |
| STEAK | 2 LBS | $5.99/LB | T-BONE | |
| | TOTAL: | $33.72 | | |

FIG. 7A

STORE NAME: WALLY'S MEGA MART /793

STORE ID: 001-FAIRFAX, VA /740

LOCATION: 007 BOND PLAZA /720

TRANSACTION #: 001 /740

DATE/TIME: MAY 15, 2006 0930 /730

| ITEM /750 | QUANTITY /760 | PRICE /770 | DESCRIPTION /780 |
|---|---|---|---|
| MILK | 1 | $2.99 | 2%, 1 GALLON |
| COOLER | 1 | $15.00 | 24 QUART, IGLOO |
| YOGURT | 5 | $3.75 | DANNON, 4OZ |
| MEAT | 2 LBS | $11.98 | T-BONE |
| TOTAL PRICE: | | $33.72 /791 | |

| ENTERPRISE ID: WALLY'S MEGA MART | | LOCATION: COLUMBIA, MD | | | |
|---|---|---|---|---|---|
| DATE: MAY 25, 2006 | | OTHER INFORMATION: NONE | | | |
| CUSTOMER ID | TRANSACTION ID | AUTHORIZATION ID | VALID | LINK | AUTHORIZATION DATE/TIME |
| B.SMITH | 001 | SMITH-001 | YES | L-1 | 5/14/06 0700 |
| J.JONES | 1234 | JONES-003 | YES | L-2 | 5/14/06 0710 |
| T.REX | WMM-543 | REX-333 | YES | L-3 | 5/20/06 1400 |
| ■■■ | ■■■ | ■■■ | ■■■ | ■■■ | ■■■ |
| D.KING | FAIRFAX-678 | 555-123 | NO | L-4 | N/A |

FIG. 8

| CUSTOMER ID: B.SMITH | | ENTERPRISE ID: WALLY'S MEGA MART | | | |
|---|---|---|---|---|---|
| DATE: JUNE 1, 2006 | | | | | |
| STORE ID | TRANSACTION ID | TRANSACTION DATE/TIME | ITEMS | CREDIT/ RETURN | OTHER INFORMATION |
| FAIRFAX, VA | 001 | 5/15/06, 0930 | F-1 | NO | LOCAL AREA |
| VIENNA, VA | 002 | 5/18/06, 1045 | V-1 | NO | LOCAL AREA |
| VIENNA, VA | 003 | 5/19/06, 1100 | V-2 | YES | LOCAL AREA |
| ■ ■ ■ | ■ ■ ■ | ■ ■ ■ | ■ ■ ■ | ■ ■ ■ | ■ ■ ■ |
| ASHLAND, MA | 004 | 5/30/06, 0600 | A-1 | NO | OUT OF AREA |

FIG. 9

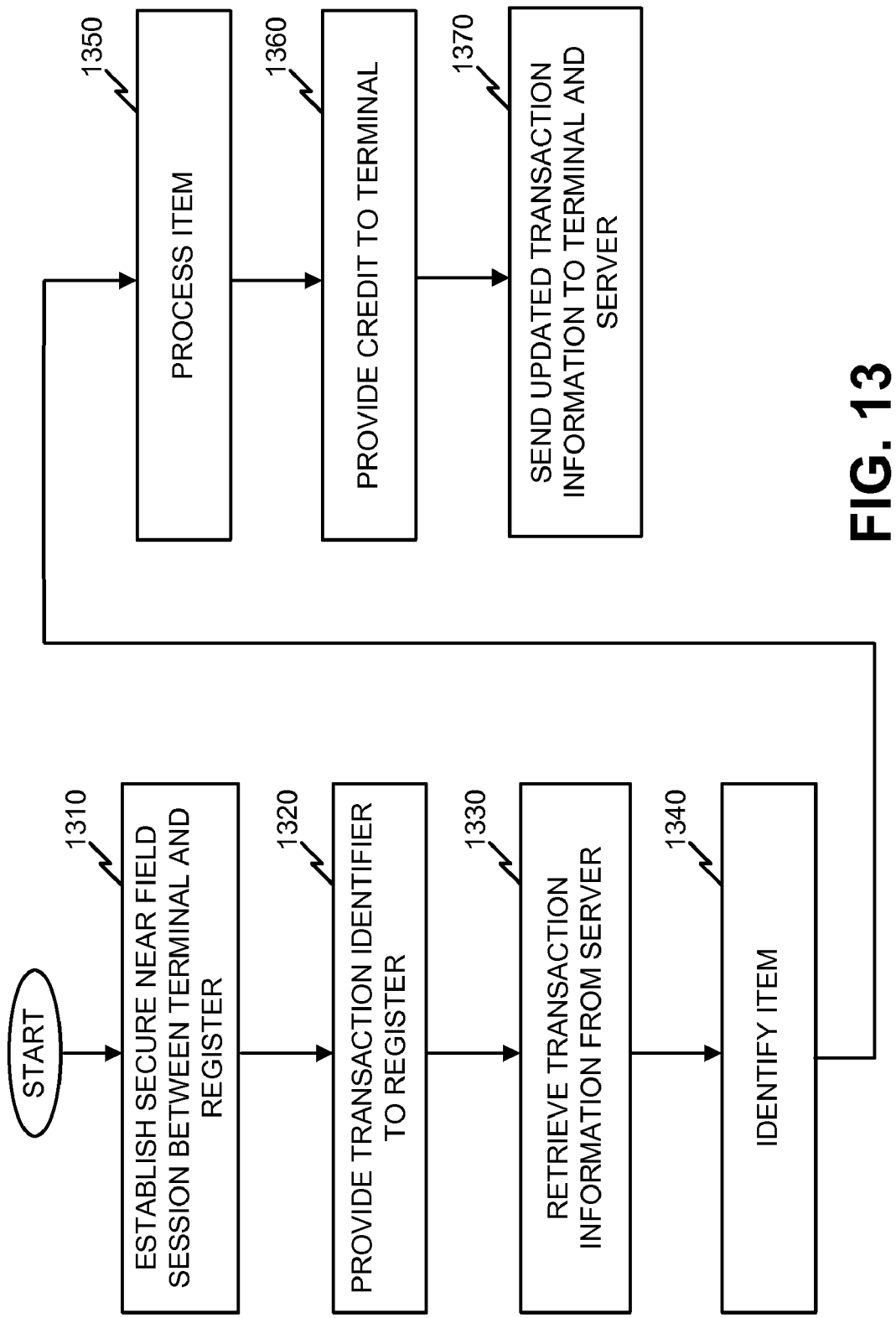

SECURE NEAR FIELD TRANSACTION

BACKGROUND OF THE INVENTION

An entity, such as a retail chain, may suffer losses due to theft of merchandise. For example, a customer may purchase an item and may dispose of the receipt as he/she leaves the store. An individual may recover the receipt from the trash and may shoplift an item from the store that is identified on the receipt or may steal an item identified on the receipt from another location (e.g., a delivery truck). The individual may return the item to the store using the receipt and may receive cash for the item.

Entities may further desire to accurately track purchases and to identify purchases with specific customers. For example, the store may wish to associate a customer with a certain receipt to allow the customer to return an item identified on the receipt. Stores may have difficulty in associating transactions with customers because a customer may not retain his/her receipt and/or the receipt may become damaged, e.g., by being washed when the receipt is left in a garment pocket by the consumer.

Entities may realize greater profits when customer purchases can accurately be tracked and related to the customer and/or when losses due to theft can be reduced and/or eliminated.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 7A illustrates an exemplary data structure to store transaction information;

FIG. 7B illustrates an exemplary receipt that can include the information of FIG. 7A;

FIG. 8 illustrates an exemplary data structure to store customer and transaction information on the server of FIG. 1;

FIG. 9 illustrates an exemplary data structure to store transaction information related to a customer;

FIG. 13 illustrates exemplary processing for a secure near field return transaction.

DETAILED DESCRIPTION OF PREFERRED EMBODIMENTS

Figure 1:
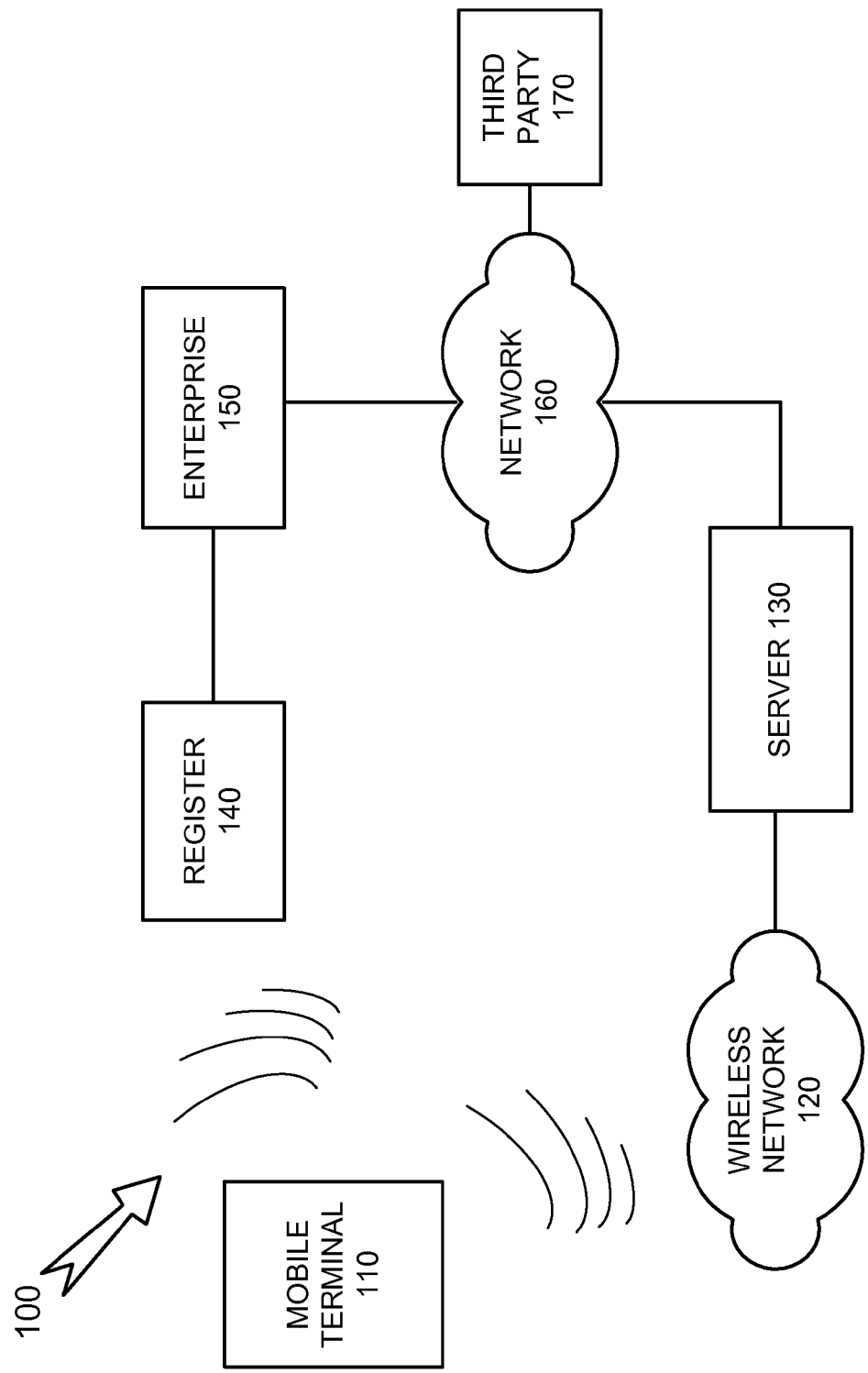
FIG. 1 illustrates an exemplary system that can be configured to operate in accordance with principles of the invention.

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations may provide entities with ways to perform secure near field wireless transactions with mobile terminals operated by customers. For example, a customer may use a cell phone to establish a secure communication session with a register in a store via a near field wireless link. The cell phone may receive information contained in the cash register receipt via the wireless link, e.g., a list of purchased items, prices for the items, quantities for the items, etc. The receipt information may appear on the cell phone display during the transaction.

The customer may pay for merchandise by sending payment information from the cell phone to the register via the near field wireless link. The cell phone may store a complete copy of the transaction thereon and/or may send its copy of the transaction to a server for remote storage and/or future recall during the transaction or when the transaction is finished.

The register may send information about the transaction (e.g., an electronic receipt) to the server for storage. The register may recall the stored receipt (e.g., via a transaction number related to the electronic receipt) when a customer wishes to return a purchased item identified on the receipt. For example, the customer may provide the transaction number to the register using his/her cell phone and the near field wireless link. The register may recall the electronic receipt from the server via the transaction number (and/or other identifying information) and may process the return. The register may send a credit to the cell phone via the near field wireless link when the item is returned.

As used herein, "consumer," "customer," and/or "user" may refer to an individual that can participate in a transaction. A consumer/customer/user may be identified with a device (e.g., a mobile terminal), a group (e.g., employees of a corporation, students at a school, members of a frequent shopper club, etc.), a location (e.g., a neighborhood, city, etc.), etc. "Transaction" may refer to an exchange of information between two parties, such as a customer and a retailer, and/or between two devices operated on behalf of the parties (e.g., a cell phone and a register). A transaction may include a purchase, an exchange, a credit, a request for services, etc. In one implementation, a transaction may include the exchange of monetary information (e.g., electronic money, credit card information, automated teller machine (ATM) information, etc.).

Implementations and processes for secure near field transactions as described herein may be incorporated into various devices and/or systems and/or may be used with a number of techniques, such as those described in patent application Ser. No. 11/465,271 entitled "Multi-Function Transaction Device" filed Aug. 17, 2006; in patent application Ser. No. 11/466,215 entitled "Party Identification In A Wireless Network" filed on Aug. 22, 2006; in patent application Ser. No. 11/463,326 entitled "Transaction Information Mining" filed on Aug. 9, 2006; and in patent application Ser. No. 11/466, 544 entitled "Virtual Wallet" filed on Aug. 23, 2006, the content of the above applications are incorporated herein by reference in their entireties, respectively.

FIG. 1 illustrates an exemplary system 100 that can be configured to operate in accordance with principles of the invention. System 100 may include a mobile terminal 110 (hereinafter terminal 110), a wireless network 120, a server 130, a register 140, an enterprise 150, a network 160, and a third party 170.

Terminal 110 may include a device that exchanges information with a destination. For example, terminal 110 may include a handheld device, such as a web-enabled cellular telephone, an Internet protocol (IP) telephone, a personal digital assistant (PDA), a computer, such as a laptop computer, a plain old telephone system (POTS) device, etc. Other implementations of terminal 110 may include other devices, such as a server and/or another computation or communication device.

In one implementation, terminal 110 may include hardware or software to establish a secure communication session with a destination, such as register 140 and/or wireless network 120. Terminal 110 may be adapted to perform near field wireless communication, e.g., communication over a distance of several inches to a few feet, and/or far field communication, e.g., communication over substantially any distance.

Terminal 110 may be configured to store information about one or more transactions and/or may send and/or receive transaction information to/from another device, such as register 140 and/or server 130. For example, terminal 110 may store information about a purchase transaction, such as information about purchased items, item prices, a location where items were purchased, information about a method of payment, etc. Terminal 110 may further send the stored information to a destination, such as a remote storage device.

Wireless network 120 may include a network that transfers information. Implementations of wireless network 120 may include cellular networks and/or other types of wireless networks, such as ad hoc wireless networks, free-space optical networks, etc. Wireless network 120 may send and/or receive information via packet-based or non-packet based exchanges. In one implementation, wireless network 120 may be operated by a service provider that provides wireless communication services to a customer, such as a user of terminal 110, as a managed service (e.g., for a monthly fee).

Server 130 may include a device that receives information from, or transmits information to, another device and/or network. For example, server 130 may include a workstation, desktop computer, laptop computer, PDA, web enabled cellular telephone, Wi-Fi device, or another type of network device. Server 130 may run applications, such as server applications, service provisioning applications, authentication and/or authorization applications, database applications, email applications, reporting applications, communication applications (e.g., wireless communication applications), e-commerce applications, etc.

In one implementation, server 130 may provide a service, such as a managed service, to other devices in system 100, such as terminal 110 and/or enterprise 150. For example, server 130 may provide communication services to terminal 110, transaction storage services to enterprise 150 and/or terminal 110, accounting information and/or services to third party 170 (e.g., when third party 170 is a firm working on behalf of enterprise 150), etc. For example, server 130 may be operated by a communication provider and may provide wireless communication services to one or more terminals 110 on a monthly subscription basis. Server 130 may further provide remote transaction storage to one or more terminals 110 and/or one or more enterprises 150. Server 130 may further communicate with third party 170 on behalf of other devices in system 100, such as terminal 110 or enterprise 150. For example, third party 170 may be a bank that maintains financial accounts for users of terminals 110 and for enterprise 150. Other implementations of server 130 may provide other functions and/or may provide other services to devices in system 100.

Register 140 may include a device that performs a transaction on behalf of a customer or device. For example, register 140 may include a cash register operated by a retailer, a transaction server operated by a web-based retailer, a computer operated by a government agency (e.g., a department of motor vehicles), a computer operated by a hospital or doctor's office, etc. Register 140 may communicate with terminal 110 via a near field wireless link while performing a transaction on behalf of terminal 110. Register may further communicate with enterprise 150 and/or server 130 regarding the transaction, such as by sending transaction details to enterprise 150 or server 130 via a network, far field wireless link, etc.

Enterprise 150 may include a device that hosts one or more registers 140. For example, enterprise 150 may include a server that is connected to registers 140 operating within a retail store via a store-wide network. Enterprise 150 may receive transaction information from one or more registers 140 and may store, process, and/or send the information to a destination, such as server 130. Enterprise 150 may request information from server 130, such as information about a transaction, information about a customer, etc.

Network 160 may include any network capable of transferring information. Implementations of network 160 may include public switched telephone networks (PSTNs), local area networks (LANs), metropolitan area networks (MANs) and/or wide area networks (WANs), such as the Internet, that may operate using substantially any network protocol, such as Internet protocol (IP), asynchronous transfer mode (ATM), synchronous optical network (SONET), etc.

Network 160 may include network devices, such as routers, switches, firewalls, gateways, and/or servers (not shown). Network 160 may be a hardwired network using wired conductors and/or optical fibers and/or may be a wireless network using free-space optical and/or radio frequency (RF) transmission paths. Implementations of networks and/or devices operating on networks described herein are not limited to any particular data type, and/or protocol.

Third party 170 may include a device that sends or receives information via network 160. Third party 170 may be a device that participates in a transaction, such as a device that verifies a credit card number, or that uses transaction information, such as by producing a result from transaction information related to a number of consumers. Third party 170 may be operated by server 130 and/or may be operated by another entity. In one implementation, third party 170 may provide services to enterprise 150 as a managed service.

Figure 2:
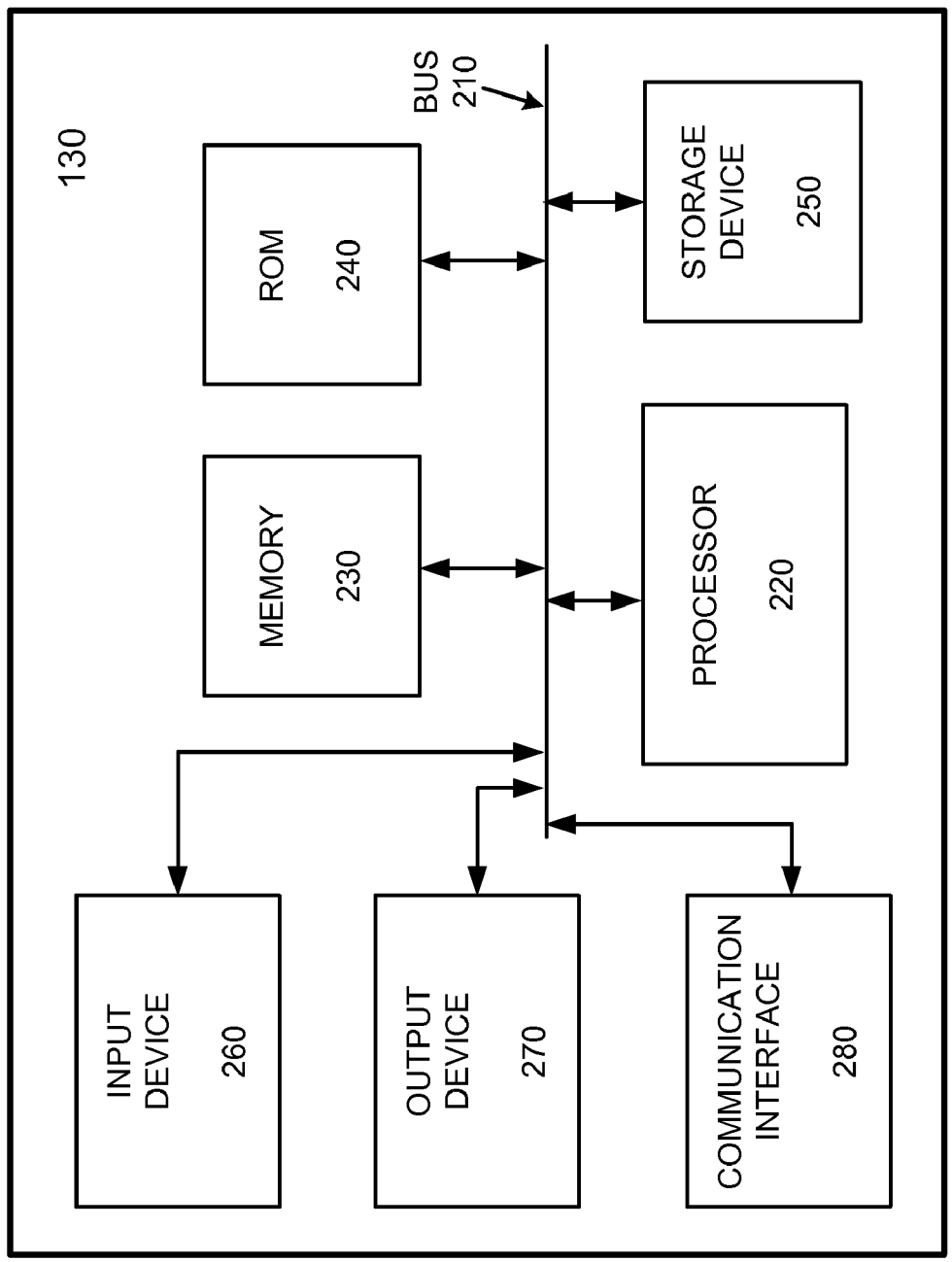
FIG. 2 illustrates an exemplary architecture for implementing the server of FIG. 1.

FIG. 2 illustrates an exemplary architecture for implementing server 130. It will be appreciated that terminal 110, register 140, enterprise 150, third party 170, and/or other devices (not shown) that can be used in system 100 may be similarly configured. As illustrated in FIG. 2, server 130 may include a bus 210, a processor 220, a memory 230, a read only memory (ROM) 240, a storage device 250, an input device 260, an output device 270, and a communication interface 280.

Bus 210 may include one or more interconnects that permit communication among the components of server 130. Processor 220 may include any type of processor, microprocessor, or processing logic that may interpret and execute instructions. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type of static storage device that may store static information and instructions for processor 220. Storage device 250 may include a magnetic disk and/or optical disk and its corresponding drive for storing information and/or instructions.

Input device 260 may include any mechanism or combination of mechanisms that permit server 130 to accept information from an operator, such as a system administrator, via devices, such as a keyboard, a mouse, a microphone, a pen-based pointing device, and/or a biometric input device, such as a voice recognition device and/or a finger print scanning device. Output device 270 may include any mechanism or combination of mechanisms that outputs information to the operator, including a display, a printer, a speaker, etc.

Communication interface 280 may include any transceiver-like mechanism that enables server 130 to communicate with other devices and/or systems, such as terminal 110, register 140, enterprise 150, and/or third party 170. For example, communication interface 280 may include a modem, an Ethernet interface, a wireless interface, and/or a port. Alternatively, communication interface 280 may include other mechanisms for communicating via a network, such as network 160.

Server 130 may perform certain functions in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement features consistent with the principles of the invention. Thus, implementations consistent with the principles of the invention are not limited to any specific combination of hardware circuitry and software.

Figure 3:
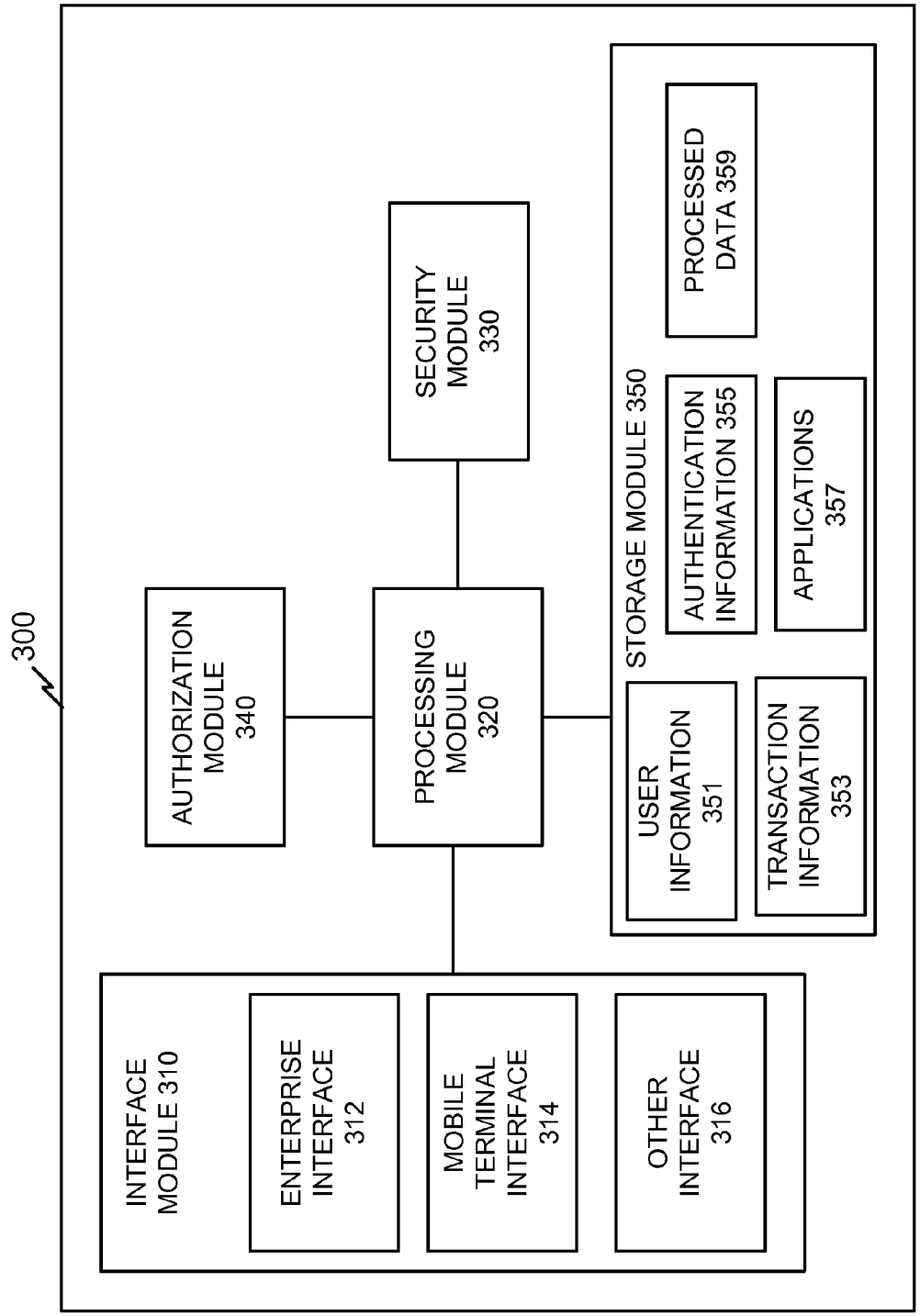
FIG. 3 illustrates an exemplary functional diagram of the server of FIG. 1.

FIG. 3 illustrates an exemplary functional diagram of server 130. Server 130 may implement hardware or software based logic to operate as a service provisioning device, an authorization device, a remote storage device, etc. Implementations of server 130 may operate on behalf of devices on wireless network 120 or network 160, such as terminal 110, enterprise 150, and/or third party 170.

An implementation of server 130 is illustrated via diagram 300 and may include an interface module 310, a processing module 320, a security module 330, an authorization module 340, and a storage module 350.

Interface module 310 may include hardware or software based logic to send and/or receive information. Interface module 310 may include an enterprise interface 312, a mobile terminal interface 314, and an other interface 316.

Enterprise interface 312 may include hardware or software based logic to exchange information with enterprise 150. For example, enterprise interface 312 may include a network interface configured to exchange encrypted or un-encrypted information with enterprise 150. In an implementation, server 130 may receive transaction information from enterprise 150 via enterprise interface 312.

Mobile terminal interface 314 may include hardware or software based logic to send information to and/or to receive information from terminal 110. Mobile terminal interface 314 may include a transceiver that sends and receives wireless data to/from terminal 110 via wireless network 120. Mobile terminal interface 314 may be adapted to send and receive encrypted information and/or un-encrypted information.

Other interface 316 may include hardware or software based logic to exchange information with another device or software module operating in system 100, such as third party 170. Other interface 316 may be adapted to exchange encrypted or un-encrypted information with the other device or software module.

Processing module 320 may include hardware or software based logic to process instructions related to providing services to terminal 110, enterprise 150, and/or third party 170, exchanging information with devices in system 100, processing data related to transactions for devices in system 100, storing transaction information on behalf of devices in system 100, etc. Processing module 320 may be implemented in a standalone or distributed configuration, such as by being distributed across one or more devices.

Security module 330 may include logic to generate security mechanisms for use with devices in system 100. Security module 330 may generate authorization devices and/or mechanisms, such as passwords, pseudo-random numbers, tokens, biometric identifiers, and/or other types of identifiers to establish an identity of a user or device. For example, security module 330 may generate a seed that is used by code on terminal 110 to generate a password or a pseudo random number. In one implementation, security module 330 may generate an authorization mechanism (e.g., a token or seed) and may send the authorization mechanism to terminal 110 so that terminal 110 can validate its identity to register 140 using the authorization mechanism.

Authorization module 340 may include hardware or software based logic to identify a user of terminal 110 or another device in system 100, to identify a device in system 100, and/or to determine whether a user/device is authorized to access a destination, participate in a transaction, and/or receive information. Authorization module 340 may receive identification and/or security information from security module 330 and/or other devices in system 100. For example, authorization module 340 may receive a token from register 140, where the token was sent from terminal 110 to register 140 prior to performing a transaction over a secure near field communication link. Authorization module 340 may receive a token copy from security module 330, where security module 330 sent the token to terminal 110 prior to terminal 110 sending the token to register 140. Authorization module 340 may compare the token to the token copy and may determine that terminal 110 is valid when the token matches the token copy. Implementations of authorization module 340 may operate with encrypted and/or unencrypted information when authorizing a user or device.

Storage module 350 may include hardware or software based logic to store information related to users, devices operated by users, transactions, payment information, account information, authentication information, etc. Storage module 350 may be implemented in server 130 and/or may be located remotely with respect to server 130 and connected thereto via a link. Storage module 350 may be implemented in memory 230, ROM 240 and/or storage device 250. In one implementation, storage module 350 may include user information 351, transaction information 353, authentication information 355, applications 357, and processed data 359.

User information 351 may include information about a user of terminal 110. For example, user information 351 may include a name, address, telephone number, mobile terminal identifier (e.g., a serial number), etc. User information 351 may further include other types of information, such as income information, shopping habit information, hobby information, family information (e.g., number of persons and ages of persons in a family or household), billing information, etc.

Transaction information 353 may include information related to a transaction. For example, transaction information 353 may include information about items purchased, quantities of items purchased, sizes, shapes, and/or styles of items purchased, date/time information related to a transaction, a transaction identifier, a merchant identifier, a location identifier, etc. Transaction information 353 may further include other types of information, such as information about returned and/or exchanged items.

Authentication information 355 may include information related to the authentication, authorization, validation, and/or identification of a user and/or device (e.g., terminal 110, register 140, etc.) in system 100. Authentication information 355 may include information used by security module 330 and/or authorization module 340. Authentication information 355 may include a user name, password, personal identification number (PIN), token, secure identification (secure ID) value, certificate, watermark, merchant identifier, transaction identifier, code (e.g., a script), etc. Authentication information 355 may also include other types of information, such as a result obtained by comparing a token to a token copy.

Applications 357 may include software applications residing on server 130. Applications 357 may include communication applications, database applications, location tracking applications, accounting applications, transaction processing applications, transaction storage applications, data compression applications, etc.

Processed data 359 may include information processed using one or more applications. For example, processed data 359 may include information produced by running code against transaction information 353 and/or user information 351 to obtain statistical information related to terminal 110, register 140, and/or enterprise 150. Processed data 359 may be used by devices or persons to make determinations with respect to customers, transactions, devices in system 100, customers' shopping activities, etc. For example, enterprise 150 may use processed data 359 that identifies a quantity of units sold for a particular item or to order additional items to restock store shelves.

Figure 4:
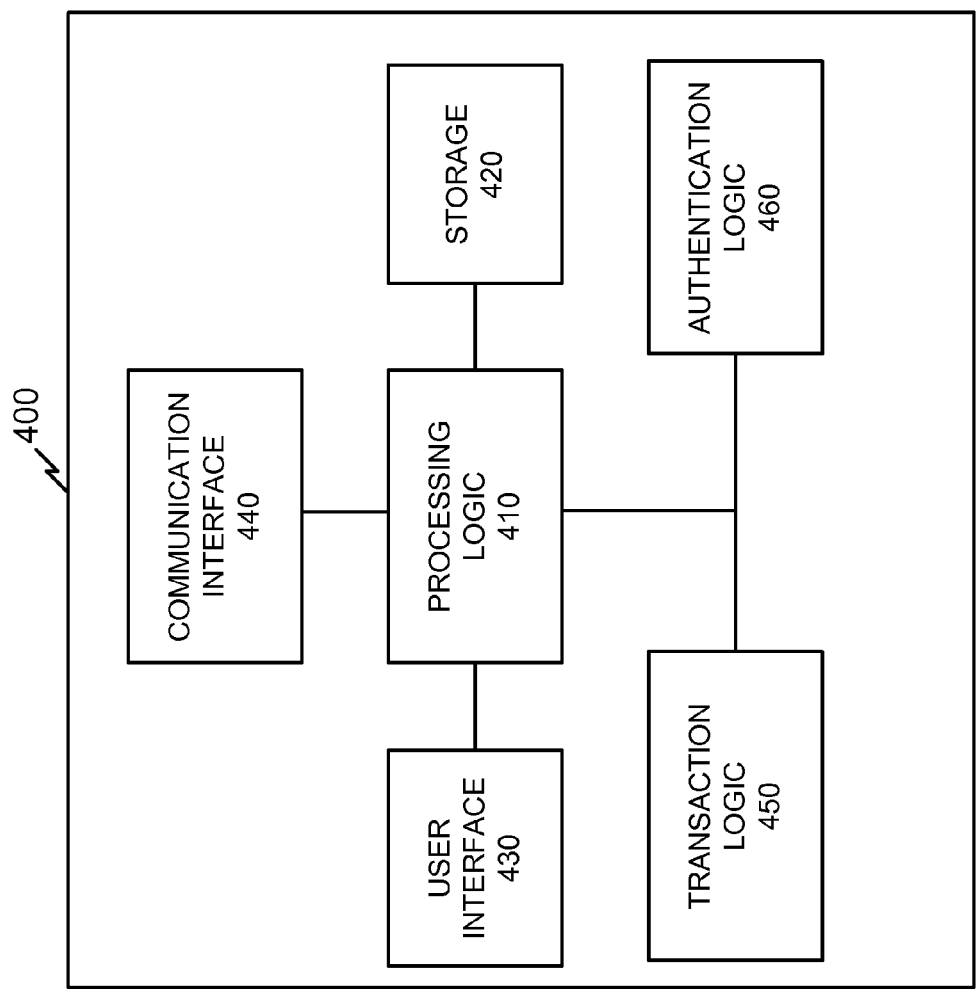
FIG. 4 illustrates an exemplary functional diagram of the mobile terminal of FIG. 1.

FIG. 4 illustrates an exemplary functional diagram of terminal 110. An implementation of terminal 110 implemented as shown in diagram 400 may include processing logic 410, storage 420, user interface 430, communication interface 440, transaction logic 450, and authentication logic 460.

Processing logic 410 may include hardware or software to process instructions related to operating terminal 110. For example, processing logic 410 may process instructions to allow terminal 110 to receive a token, to establish a secure communication session with register 140, to participate in a transaction with register 140, and/or to establish communication sessions with other devices in system 100. Processing logic 410 may be implemented in a standalone or distributed configuration, such as by being distributed across one or more devices.

Storage 420 may include hardware or software based logic to store information related to transactions, payments, accounts, calendars, phone/address books, images, text, music, navigation applications, etc. Storage 420 may be implemented locally in terminal 110 and/or may be located remotely with respect to terminal 110 and connected thereto via a link, e.g., when server 130 provides remote storage capabilities to terminal 110.

In one implementation, storage 420 may be adapted to operate as a virtual wallet for a user of terminal 110. For example, storage 420 may store information that might be maintained in a conventional wallet, such as social security numbers, drivers license information, credit cards, automated teller machine (ATM) cards, club membership cards, currency (e.g., electronic money), etc. For example, terminal 110 may retrieve credit card information from the virtual wallet to conclude a purchasing transaction with register 140.

User interface 430 may include hardware or software based logic that allows a user to interact with terminal 110. User interface 430 may include a keypad or other input device, a display, a speaker, a microphone, a tactile actuator (e.g., a vibrating device), control keys, etc. For example, user interface 430 may display mirrored data received from register 140 onto a display device of terminal 110 during a transaction.

Communication interface 440 may include hardware or software based logic that allows terminal 110 to communicate with other devices. Implementations of communication interface 440 may include an antenna, a transmitter that may convert baseband signals from processing logic 410 to radio frequency (RF) signals and/or a receiver that may convert RF signals from the antenna to baseband signals. Alternatively, communication interface 440 may include a transceiver that performs the functions of both a transmitter and a receiver. Communication interface 440 may operate with other components, such as processing logic 410, user interface 430 (e.g., a display device) and/or authentication logic 460 when establishing a communication session on behalf of terminal 110.

Communication interface 440 may include a near field communication component that allows terminal 110 to participate in communication sessions over short distances, such as distances up to several feet (e.g., on the order of 30 feet) and a far field communication component that allows terminal 110 to participate in communication sessions over substantially any distance (e.g., communicating with a cell tower that is located several miles away from terminal 110 and/or communicating with a satellite).

Assume, for sake of example, that terminal 110 may receive a query from a radio frequency identification (RFID) transmitter on register 140. Terminal 110 may process the signal and communication interface 440 may make information, such as a token that identifies terminal 110, available to register 140 via a near field communication signal. Communication interface 440 may be adapted to send and/or receive communication signals via radio frequency (RF), free-space optical, and/or free-space acoustic waveforms.

Transaction logic 450 may include hardware or software based logic to perform transactions with a device, such as register 140 or server 130. For example, transaction logic 450 may include a transaction application that allows terminal 110 to establish near field sessions with register 140 via communication interface 440 and/or to exchange transaction information with register 140 (e.g., item names, quantities, prices, payment information, etc.). In one implementation, transaction logic 450 may include logic that allows a display device on terminal 110 to mirror items displayed on a display of register 140. Transaction logic 450 may operate with authentication logic 460, communication interface 440, and/or other components in terminal 110 when initiating, participating in, and/or concluding transactions with devices.

Authentication logic 460 may include hardware or software based logic that allows terminal 110 to establish its identity with another device. Authentication logic 460 may include logic that allows terminal 110 to receive and/or generate a token, such as a string of digits that can be used to identify terminal 110 with respect to other devices in system 100, such as register 140. Authentication logic 460 may further allow a user of terminal 110 to enter information, such as a password, PIN, answer to a prompt, etc. to establish an identity of terminal 110.

For example, in an implementation, authentication logic 460 may send a rolling code to a device in response to a query, where the rolling code is adapted to uniquely identify terminal 110 in a way that discourages spoofing by another party, such as a party operating a malicious device (eavesdropper) in system 100. Authentication logic 460 may allow terminal 110 to participate in secure sessions with devices in system 100 when terminal 110 is validated to the devices.

In one implementation, authorization logic 460 may include an RFID chip that includes a secure identification value (SIV), such as an electronic serial number (ESN). The RFID chip may receive a query from an RFID transceiver (e.g., a reader and a transmitter) and may provide an ESN to register 140 in response to the query, where the ESN uniquely identifies terminal 110. An ESN may be combined with other types of identifiers to identify terminal 110 to other devices. For example, in one implementation, terminal 110 may employ a secure identification value (SIV) that may include an ESN, a secure ID token (e.g., a rolling code), and/or a PIN. Terminal 110 may provide the SIV in response to a query, such as an RFID query, to identify terminal 110 to the device sending the query.

In another implementation, authentication logic 460 may include a secure identification (secure ID) value, e.g., a token, that is synchronized with another device, such as server 130. Terminal 110 may provide the secure ID token to register 140 in response to a request, and register 140 may verify the token via the other device (e.g., server 130).

In still another implementation, authentication logic 460 may include an RFID scanner, or another type of scanner, to allow terminal 110 to participate in peer-to-peer secure communication sessions. For example, a peer-to-peer secure communication session may occur when terminal 110 exchanges transaction information with a wireless PDA operated by another user, such as user hosting a yard sale.

Figure 5:
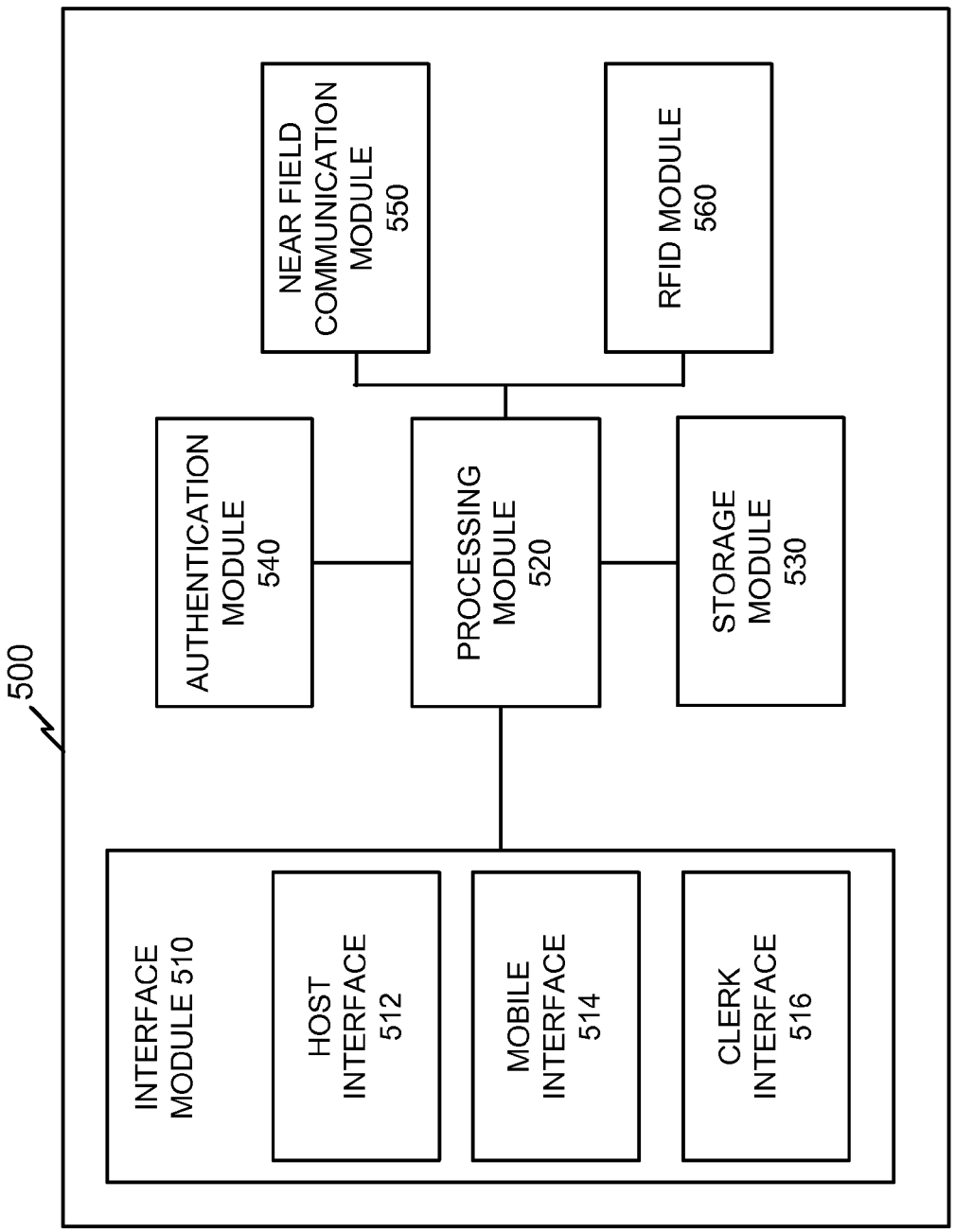
FIG. 5 illustrates an exemplary functional diagram of the register of FIG. 1.

FIG. 5 illustrates an exemplary functional diagram of register 140. An implementation of register 140 may be implemented as shown in diagram 500 and may include interface module 510, processing module 520, storage module 530, authentication module 540, near field communication module 550 and radio frequency identification (RFID) module 560. Interface module 510 may include hardware or software based logic to send and/or receive information and may include host interface 512, mobile interface 514, and clerk interface 516. Host interface 512 may include hardware or software based logic that allows register 140 to exchange information with enterprise 150. In an implementation, host interface 512 may connect register 140 to enterprise via a private network, such as a LAN.

Mobile interface 514 may include hardware or software based logic to exchange information with terminal 110. For example, mobile interface 514 may operate with near field communication module 550 to send information to and receive information from terminal 110 during a transaction session. In one implementation, mobile interface 514 may send transaction receipt information to terminal 110 so that the information can appear on a display of terminal 110 during a transaction between terminal 110 and register 140. Mobile interface 514 may also receive payment information and/or other information from terminal 110.

Clerk interface 516 may include hardware or software based logic that allows a clerk to interact with register 140. For example, clerk interface 516 may include a keypad, keyboard, or other input device to allow the clerk to input information into register 140, and/or an output device, such as a display device or printer, to provide information to the clerk.

Processing module 520 may include hardware or software based logic to process instructions related to performing transactions with terminal 110, server 130 and/or enterprise 150, authenticating terminal 110 prior to a transaction, determining amounts due based on items included in a transaction, etc.

Storage module 530 may include hardware or software based logic to store information related to terminal 110, transactions performed with terminal 110, authentication information about terminal 110, etc.

Authentication module 540 may include hardware or software based logic to authenticate an identity of terminal 110. Authentication module 540 may operate with server 130, enterprise 150 and/or third party 170 when authenticating terminal 110. In one implementation, authentication module 540 may operate with mobile interface 514 to query terminal 110 for identifying information. Register 140 may process identification information received from terminal 110 via authentication module 540 and/or processing module 520. In one implementation, register 140 may send the identifying information to enterprise 150 or server 130 and may receive a result therefrom that indicates whether terminal 110 has been validated.

Near field communication module 550 may include hardware or software based logic to send information to terminal 110 and to receive information from terminal 110 via a near field communication link. Near field communication module 550 may include a near field transceiver that allows register 140 to send information to terminal 110, such as an RFID query, and/or to receive information from terminal 110, such as a token. Near field communication module 550 may be an IEEE 802.x interface (e.g., a Bluetooth interface) and/or another type of interface that can communicate via free-space RF, optical, or acoustic waveforms. In one implementation, near field communication module 550 may exchange information with terminal 110 via encrypted packet-based or non-packet based transmissions.

RFID module 560 may include hardware or software based logic to allow register 140 to send information, such as queries, to RFID logic operating in terminal 110. For example, RFID module 560 may be a plug-in module that can be installed on register 140 to allow register 140 to query terminal 110. Register 140 may query terminal 110 when RFID module 560 senses the presence of terminal 110 (e.g., when terminal 110 is moved proximate to a reader related to RFID module 560). The query may initiate an exchange of authentication information between terminal 110 and register 140 to establish a secure near field communication session with terminal 110.

Figure 6:
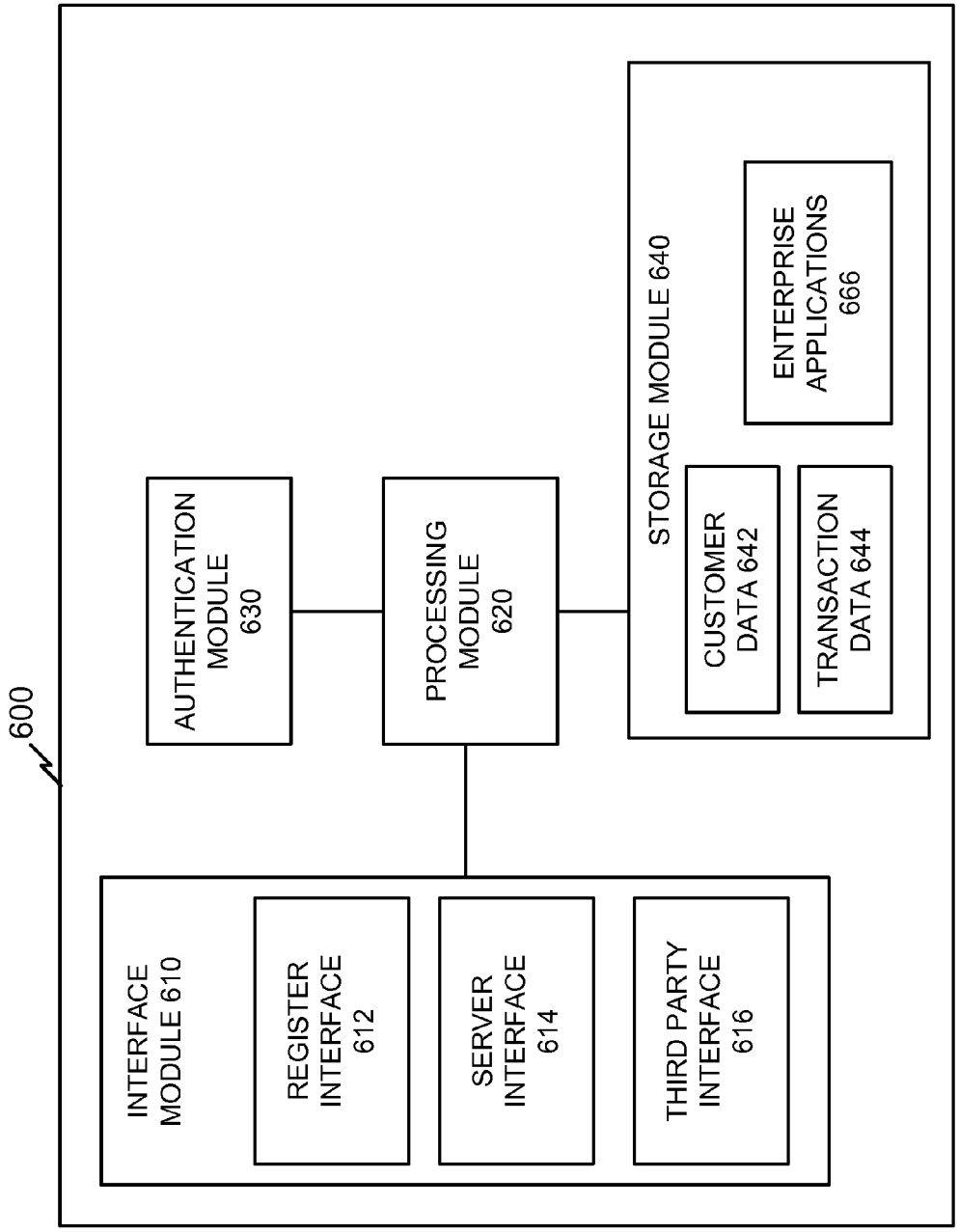
FIG. 6 illustrates an exemplary functional diagram of the enterprise of FIG. 1.

FIG. 6 illustrates an exemplary functional diagram of enterprise 150. An implementation of enterprise 150 is implemented as shown in diagram 600 and may include interface module 610, processing module 620, authentication module 630, and storage module 640. Interface module 610 may include hardware or software based logic to send and/or receive information. Interface module 310 may include a register interface 612, server interface 614, and third party interface 616. Register interface 612 may include hardware or software based logic that allows enterprise 150 to exchange information with register 140. For example, enterprise 150 may exchange customer identifiers, transaction information, time/date information, payment information, frequent shopper card information, etc., with register 140 via register interface 612.

Server interface 614 may include hardware or software based logic that allows enterprise 150 to communicate with server 130. For example, server interface 614 may be a network interface card (NIC) that allows enterprise 150 to establish secure or non-secure communication sessions with server 130. Third party interface 616 may include hardware or software based logic that allows enterprise 150 to exchange information with third party 170. Implementations of third party interface 616 may allow enterprise 150 to exchange encrypted or non-encrypted information with third party 170.

Processing module 620 may include hardware or software based logic to process instructions related to performing transactions with terminal 110, server 130 and/or third party 170, authenticating terminal 110, sending and/or receiving mining information, to/from server 130, etc. Processing module 620 may be implemented in a standalone or distributed configuration, such as by being distributed across one or more devices.

Authentication module 630 may include hardware or software based logic to authenticate an identity of terminal 110 to register 140 and/or enterprise 150. Authentication module 630 may operate with server 130 and/or third party 170 when authenticating terminal 110. For example, enterprise 150 may receive tokens, passwords, PIN validation, etc., from an authorization component operating in server 130. Enterprise 150 may use the received information to authenticate terminal 110.

Storage module 640 may include hardware or software based logic to store information related to terminal 110, register 140, transactions, payments, inventories, accounts, device authentications, etc. In an implementation, storage module 640 may include customer data 642 that identifies customers related to terminals 110, transaction data 644 that may include information related to transactions performed on behalf of terminal 110 and/or enterprise 150, and enterprise applications 666 that may include applications run in enterprise 150 to perform operations, such as operating a number of registers 140, exchanging information with server 130, processing transactions related to register 140, etc.

FIG. 7A illustrates an exemplary data structure 700 to store transaction information. Data structure 700 may include information arranged in a row by column format to facilitate use by an individual, such as a clerk or customer. Data structure 700 may reside in terminal 110, register 140, server 130, enterprise 150, etc. The implementation of data structure 700 discussed in connection with FIG. 7A is exemplary and other implementations of data structure 700 are possible. Other implementations of data structure 700 may include more fields or fewer fields.

An implementation of data structure 700 can include store ID 710, store location 720, date 730, transaction number 740, item ID 750, quantity 760, price 770, description 780, comments 790, and total 791. Store ID 710 may include information that identifies an entity that is involved in a transaction related to data structure 700. Store ID 710 may include a name, number, or other identifier.

Store location 720 may include information that identifies a location where a transaction related to data structure 700 takes place. For example, store location 720 may include an address of an establishment involved in a transaction with terminal 110. Date 730 may include information that identifies a date and/or time when a transaction occurred and/or when data structure 700 was created, modified, stored, etc. Transaction number 740 may include information that identifies a transaction. For example, a transaction number may be used to identify a receipt that includes descriptions of items purchased during a transaction.

Item ID 750 may include information that identifies an item or service purchased, exchanged, or otherwise related to a transaction. For example, item ID 750 may include names of items purchased during a transaction. Quantity 760 may include information that identifies a number of items related to item ID 750 and/or price 770.

Price 770 may include information that identifies a cost related to an item identified by item ID 750. Description 780 may include information that describes an item identified by item ID 750. Comments 790 may include information related to an item identified by item ID 750. For example, comments 790 may include information about a size, color, or shape of a purchased item, description of what an item is to be used for, information about rebates, etc.

Total 791 may include information that identifies a totaled value for data structure 700. For example, total 791 may include a value that represents the cost of items 750 included in data structure 700.

FIG. 7B illustrates an exemplary receipt that can be displayed via terminal 110 or register 140. In one implementation, receipt 792 may be generated from information in data structure 700. Receipt 792 may be an electronic receipt displayed on a device, such as a display on terminal 110 or register 140, and/or may be a hard copy receipt (e.g., a paper receipt). Receipt 792 may include store ID 710, location 720, date 730, transaction number 740, item ID 750, quantity 760, description 780, total 791 and store name 793. Store ID 710, location 720, date 730, transaction number 740, item ID 750, quantity 760, description 780, and total 791 may be as described in connection with FIG. 7A. Store name 793 may include information that identifies a store, such as a store name, number, or other type of identifier. Register 140 may mirror information included in receipt 792 onto a display of terminal 110 during a transaction.

FIG. 8 illustrates an exemplary data structure 800 to store customer and transaction information on a server. Data structure 800 may include information arranged in a row by column format to facilitate use by an individual, such as an administrator, a store manager, an accountant, or an analyst performing activities on behalf of server 130, register 140, enterprise 150, etc. Data structure 800 may reside on server 130, enterprise 150, third party 170, etc. The implementation of data structure 800 discussed in connection with FIG. 8 is exemplary and other implementations of data structure 800 are possible. For example, other implementations of data structure 800 may include more fields or fewer fields.

Data structure 800 may include enterprise ID 810, location 820, date 830, other information 840, customer ID 850, transaction ID 860, authorization ID 870, valid field 880, link field 890, and authorization date/time 895. Enterprise ID 810 may include information that identifies an enterprise 150 related to information in data structure 800. For example, enterprise ID 810 may include information that identifies a store that conducted transactions with customers identified via customer ID 850 using one or more registers 140. Location 820 may identify a location where transactions with customers identified by customer ID 850 occurred. Location 820 may include a single location entry or multiple location entries. Date 830 may include information that identifies a date when data structure 800 was created, modified, saved, etc. Other information 840 may include information related to entries in data structure 800. For example, other information 840 may include the name of a manager that was on duty at a store (e.g., enterprise 150) where transactions in transaction ID 860 occurred.

Customer ID 850 may include information that identifies one or more customers that participated in transactions identified via transaction ID 860. Customer ID 850 may include a name, number, or other identifier. Transaction ID 860 may include information that identifies a transaction involving a customer identified via customer ID 850 and/or an enterprise identified by enterprise ID 810. Transaction ID 860 may correspond to transaction number 740 (FIG. 7A) in one implementation. Other implementations of transaction ID 860 may include other information. Transaction ID 860 may include a name, number, symbol, or other type of identifier. Authorization ID 870 may include information that can be used to determine whether a customer identified via customer ID 850 is authorized to participate in a transaction. For example, authorization ID 870 may include information that identifies a token used to authenticate and/or authorize a customer. In one implementation, authorization ID 870 may include a link to a data structure that contains authorization information about a customer identified in customer ID 850.

Valid field 880 may include information that identifies whether an authorization related to a customer identified via customer ID 850 is valid. Valid authorizations may allow a customer to participate in transactions using terminal 110 using a near field wireless link, a mirrored display, etc. In contrast, an invalid authorization may prevent the customer from participating in transactions using terminal 110. Link field 890 may include information that identifies a link related to entries in data structure 800. For example, link L-1 may couple information about demographics related to B. Smith to transaction 001, information about purchases that occurred prior to transaction 001 (B. Smith), etc. Authorization date/time 895 may include information that identifies a date and/or time on which a transaction was authorized and/or took place.

FIG. 9 illustrates an exemplary data structure 900 to store transaction information related to a customer. Data structure 900 may include information arranged in a row by column format to facilitate use by an individual, such as an administrator, accountant, a store clerk, a store manager, an auditor, etc. Data structure 900 may reside on server 130, register 140, enterprise 150, third party 170, etc. The implementation of data structure 900 discussed in connection with FIG. 9 is exemplary and other implementations of data structure 900 are possible. For example, other implementations of data structure 900 may include more fields or fewer fields.

Data structure 900 may include enterprise ID 810, customer ID 850, transaction ID 860, date 920, store ID 930, transaction date/time 950, items 960, credit/return 970, and other information 980. Customer ID 850 may identify a customer and date 920 may identify a date and/or time when data structure 900 was created, modified, saved, etc. Enterprise ID 810 may identify enterprise 150 that operates one or more registers 140 used in transactions identified by transaction ID 860. Store ID 930 may include information that identifies a store that participated in a transaction with a customer identified via customer ID 850. For example, "Fairfax, Va." may identify a store location. Transaction ID 860 may identify a transaction involving the customer identified via customer ID 850.

Transaction date/time 950 may include information that identifies a date and/or time on which a transaction identified via transaction ID 860 took place. Items 960 may include information that identifies one or more items purchased, exchanged, etc., during a transaction identified via transaction ID 860. In an implementation, items 960 may include a link to another data structure or file that may include items related to a transaction. For example, K-1 may refer to a file that includes information about all items purchased during a transaction (e.g., transaction ID: 001), such as quantities, item names, prices, method of payment, etc. For example, K-1 may refer to data structure 700 in an implementation.

Credit/return 970 may include information that identifies whether items related to a transaction identified by transaction ID 860 have been returned or credited. For example, credit/return 970 may include "yes" when the customer has returned or exchanged an item identified in a receipt related to a transaction identified via transaction ID 860.

Other information 980 may include information related to other entries in data structure 900. For example, other information 980 may indicate whether a transaction was made within a customer's normal shopping area, in person, via a phone, via the web, etc.

Figure 10:
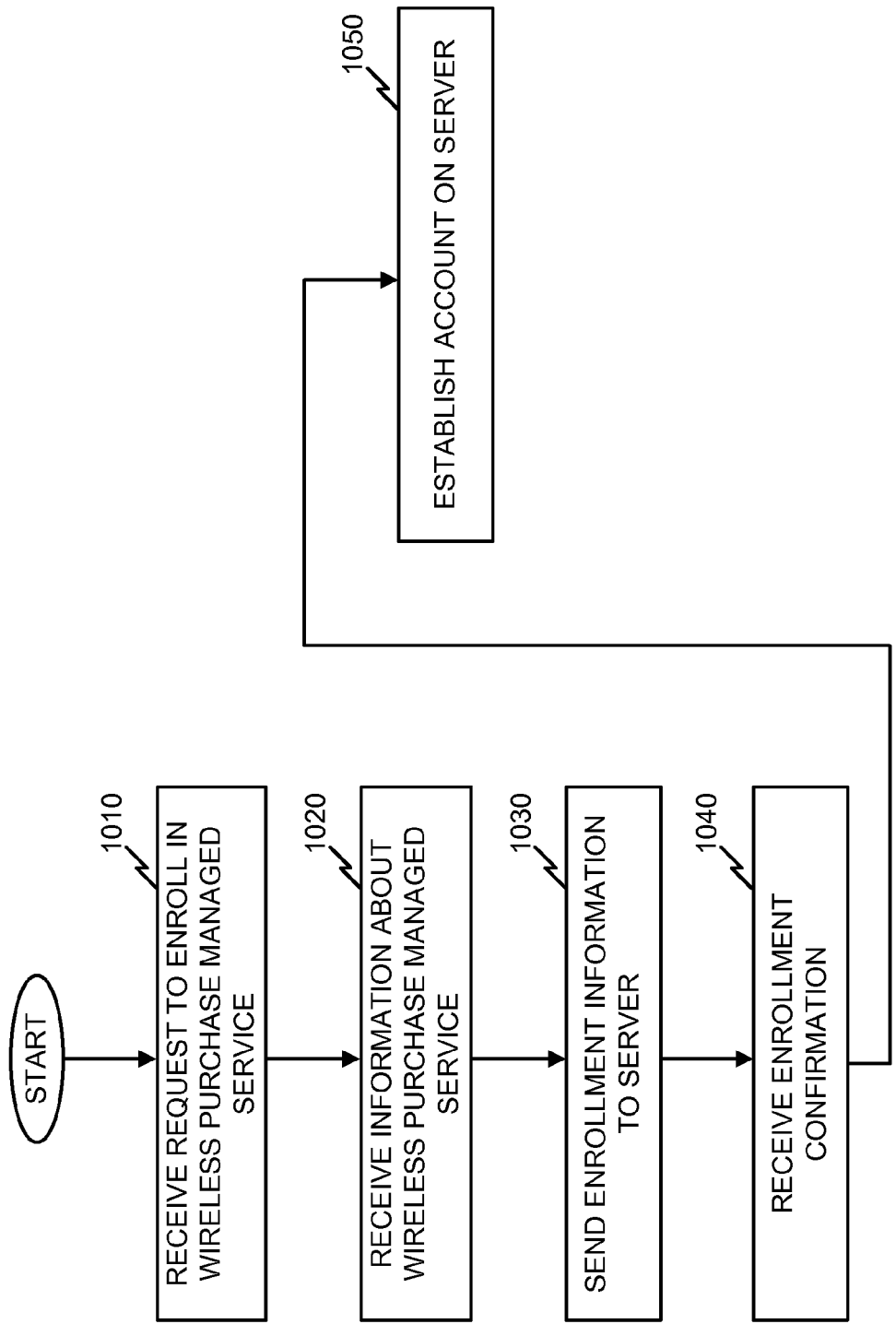
FIG. 10 illustrates an exemplary process for enrolling a mobile terminal in a managed service that allows the mobile terminal to participate in secure near field transactions with a register.

FIG. 10 illustrates an exemplary process for enrolling terminal 110 in a managed service that allows terminal 110 to participate in near field transactions with register 140. An entity, such as a communications provider, may offer wireless device users the ability to enroll in a managed service that allows users to receive transaction information via terminal 110 and to make payments via terminal 110. The provider may send information about the managed service to mobile terminal users, such as subscribers of wireless communication services offered by the provider.

A user may receive a request to enroll in a wireless purchase managed service (block 1010). For example, a user may receive an offer via his/her terminal 110. The user may request additional information about the service, such as details describing how the service works, benefits of using the service, and/or the cost of the service. The user may receive information about the service via terminal 110 (block 1020).

The user may decide to enroll in the managed service and may send his/her permission to server 130 (block 1030). For example, the user may complete an online enrollment form via a web enabled terminal 110, may enroll by speaking with an operator via phone, or may enroll at a participating store, such as enterprise 150. Terminal 110 may receive enrollment confirmation (block 1040). For example, server 130 may send token generating code to terminal 110 and/or may send other types of information to terminal 110, such as names of participating enterprises 150. Server 130 may establish an account on behalf of terminal 110 (block 1050). The user may participate in the wireless purchase service when he/she is enrolled therein.

Server 130 may send code (e.g., software) to terminal 110 when the user enrolls in the wireless purchase service. For example, server 130 may upload software to terminal 110 that allows terminal 110 to participate in near field communication sessions with register 140, that allows terminal 110 to generate tokens used to establish authorized sessions with register 140, that allows terminal 110 to display mirrored transaction information received from register 140, etc.

Figure 11:
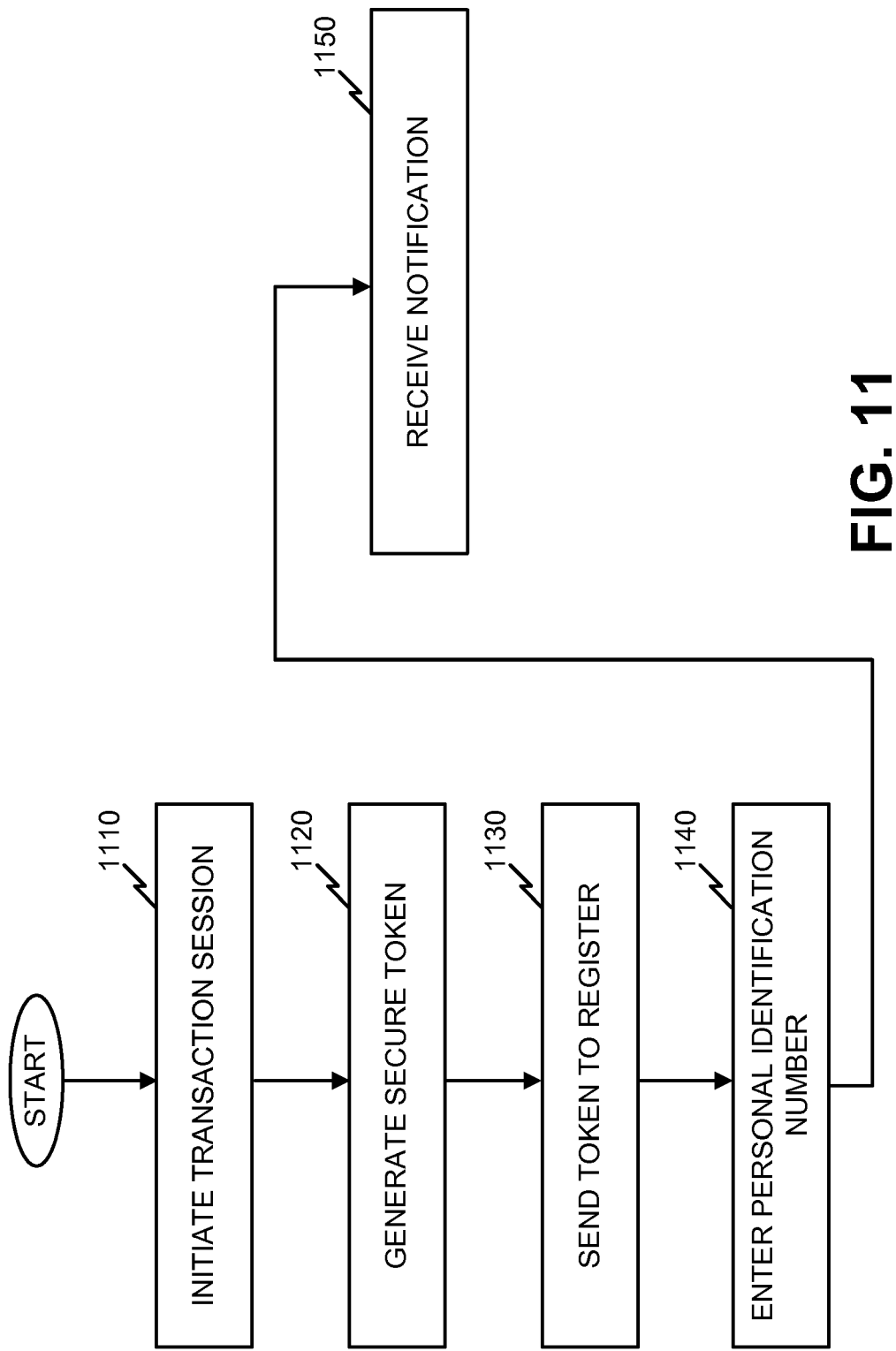
FIG. 11 illustrates exemplary processing to authenticate a mobile terminal.

FIG. 11 illustrates exemplary processing to authenticate a mobile terminal 110. A user may shop in a retail store while carrying terminal 110. When the user desires to check out at the store, the user may swipe his/her terminal 110 proximate to a reader (e.g., an RFID reader) connected to register 140. The reader may be configured to initiate a transaction session when terminal 110 is detected (block 1110). For example, terminal 110 may include an RFID chip that is sensed by an RFID reader connected to register 140. In one implementation, the RFID reader may be part of RFID module 560 (FIG. 5) and may query terminal 110 upon sensing terminal 110.

Terminal 110 may generate a secure token in response to a query received from register 140 (block 1120). For example, terminal 110 may include logic, such as authentication logic 460, to generate a token using a seed. In an implementation, terminal 110 may use a time value received from wireless network 120 as a seed and may run code to generate a pseudo-random number based on the seed. The pseudo-random number may act as a token for transactions between terminal 110 and another device, such as register 140.

Terminal 110 may send the token to register 140 (block 1130). For example, terminal 110 may send the token to register 140 via a near-field link, such as a Bluetooth connection. In one implementation, terminal 110 may send other information, such as an electronic serial number (ESN) encoded into terminal 110, to register 140 in addition to the token or in lieu of the token. A user may enter a PIN into terminal 110 via a keypad or other input device (block 1140). The PIN may be adapted to supplement the token and/or ESN to establish an identity of terminal 110. The keypad on terminal 110 may be adapted to allow for secure entry of digits, letters, or symbols used in the PIN. Terminal 110 may send the PIN to register 140 via communication interface 440, e.g., via a near field communication portion of communication interface 440.

Register 140 may send the token, ESN and/or PIN to enterprise 150 via host interface 512, and enterprise 150 may forward the token, ESN and/or PIN to server 130 via network 160. Server 130 may maintain the same time value as terminal 110 (e.g., by running a master clock for wireless network 120) and may use the same code (e.g., computer implemented algorithm) to generate a token copy that matches the token generated by terminal 110 when terminal 110 is a valid wireless terminal.

For example, server 130 may operate a master clock that sends time values to devices on wireless network 120, such as terminal 110. Server 130 may compare the token copy to a token received from enterprise 150 and may determine whether the token received from enterprise 150 on behalf of terminal 110 is from a valid terminal 110. In one implementation, matching tokens/token copies may indicate that terminal 110 is a legitimate device that is operated by a subscriber enrolled in the wireless transaction service provided by server 130. Server 130 may use the PIN and/or ESN to further establish the identity of terminal 110. For example, server 130 may use the ESN to determine an algorithm (code) that should be used to generate a token copy based on a master clock time value so that the correct type of token copy can be compared to the token received from terminal 110.

Server 130 may send a notification to register 140 via enterprise interface 312 that indicates whether terminal 110 is authorized to participate in a transaction with register 140. Terminal 110 may receive a forwarded notification from register 140 via communication interface 440 (block 1150). Terminal 110 and register 140 may be allowed to participate in a secure transaction session when terminal 110 is validated via server 130.

Figure 12:
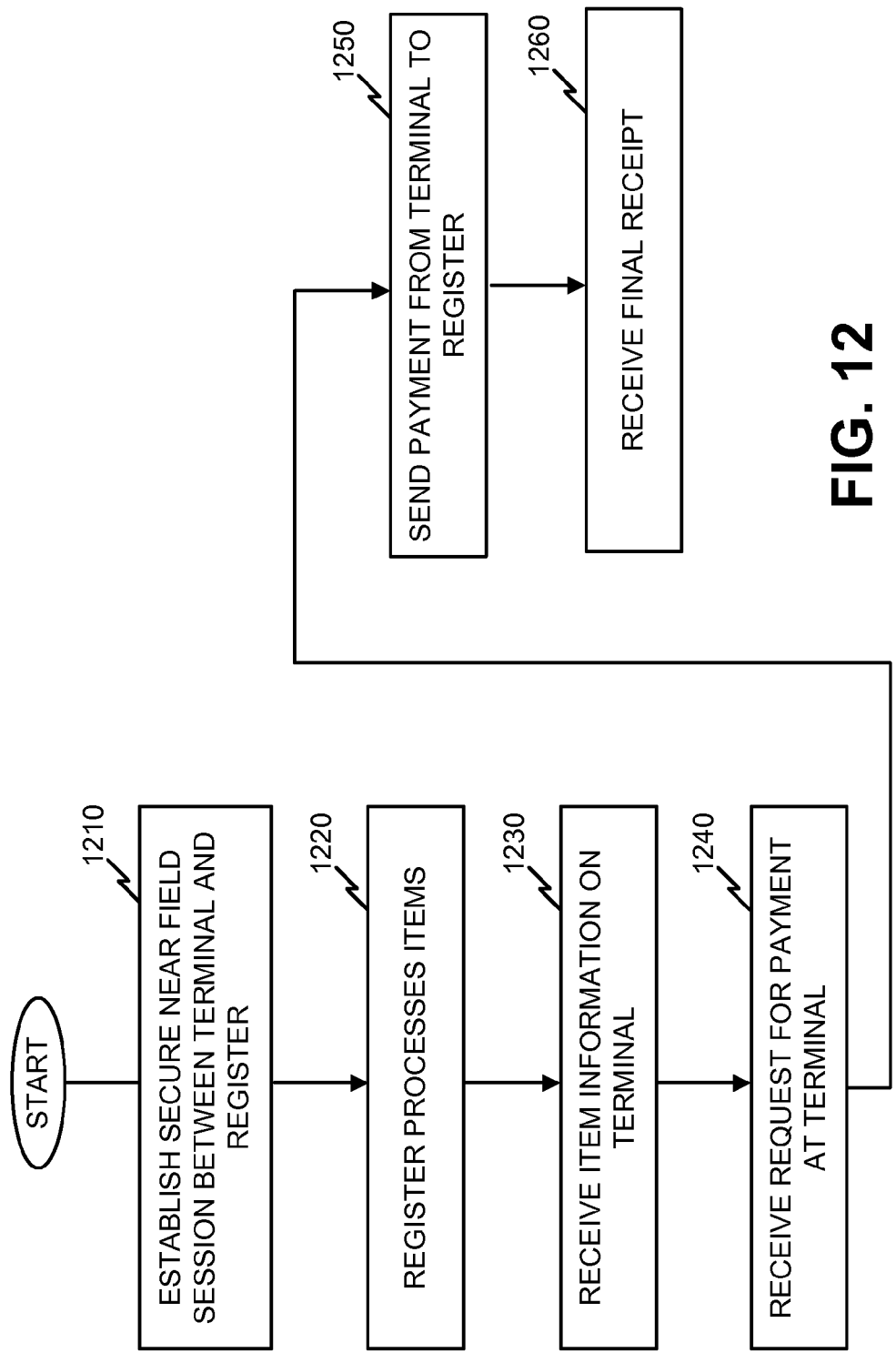
FIG. 12 illustrates exemplary processing for a secure near field purchase transaction.

FIG. 12 illustrates exemplary processing for a secure near field purchase transaction. Terminal 110 and register 140 may establish a secure near-field communication session (block 1210). In one implementation, terminal 110 and register 140 may establish the secure near-field communication session after performing the authentication process illustrated in FIG. 11.

Register 140 may process items purchased by a user of terminal 110 (block 1220). For example, a clerk may run bar coded items past a bar code reader connected to register 140 to register the item, a quantity for the item, and a price of the item. Register 140 may print information about scanned items on a paper receipt, may display information about scanned items on a register display, and/or may store information about scanned items in storage module 530.

Terminal 110 may receive information about scanned items via the near-field communication session (block 1230). In an implementation, register 140 may mirror data rendered on a register display to a display device in terminal 110 via an encrypted wireless signal. For example, if the register display shows "Oreo one pound package, quantity 1, price: $2.99," a display device on terminal 110 may display the same information. The display device on terminal 110 may be updated whenever the register display is updated, such as when another item is scanned. For example, a display on terminal 110 may display receipt 792 (FIG. 7B) when receipt 792 is displayed on register 140.

Terminal 110 may store transaction information received from register 140 in storage 420. The stored information may act as a virtual receipt in terminal 110. Terminal 110 may receive a request for payment once all items have been recorded by register 140 (block 1240). For example, register 140 may send information identifying a total amount due (e.g., total 791) for the transaction to terminal 110.

Terminal 110 may send payment to register 140 (block 1250). In an implementation, a user of terminal 110 may select a payment type (e.g., ATM card, credit card, gift card, cash, etc.) from a virtual wallet on terminal 110 and may send payment information to register 140. Register 140 may process the payment information, such as by contacting a server operated by an institution issuing a credit card. Register 140 may send a final receipt to terminal 110 when a transaction is completed (block 1260). The final receipt may include final transaction information that identifies all items and/or other information related to the transaction.

Register 140 and/or terminal 110 may send transaction information to another device, such as enterprise 150 and/or server 130 for archiving. Archived transaction information may be retrieved from storage using, for example, a transaction number, when a user of terminal 110 returns an item purchased during the transaction. Archived transaction information may be stored in terminal 110, server 130, register 140, enterprise 150, etc., via data structure 700. Information for a number of transactions, such as transactions conducted with enterprise 150 during a determined interval, e.g., during a shopping day, may be stored in server 130 or enterprise 150 via data structure 800.

FIG. 13 illustrates exemplary processing for a secure near field return transaction. Terminal 110 may establish a secure near field communication session with register 140 (block 1310). In one implementation, terminal 110 and register 140 may establish the secure near field session via the blocks of FIG. 11.

Terminal 110 may provide a transaction identifier to register 140 (block 1320). For example, terminal 110 may send transaction number 740 to register 140 to identify an electronic receipt (e.g., receipt 792 in FIG. 7B or data structure 700 in FIG. 7A). Alternatively, terminal 110 may send its copy of the transaction (e.g., electronic receipt 792) to register 140. For example, terminal 110 may retrieve the receipt from remote storage (e.g., server 130) and may send the retrieved receipt to register 140.

Register 140 may receive the transaction identifier (or receipt) from terminal 110. Register 140 may retrieve a copy of the transaction (e.g., receipt 792) from server 130 (block 1330). For example, register 140 may send transaction number 001 to server 130, and server 130 may retrieve receipt 792 from a storage location, such as transaction information 353. Server 130 may send receipt 792 to register 140 via a secure link, e.g., a virtual private network (VPN) tunnel, over network 160.

Terminal 110 may send an item identification to register 140 via the secure near field link to identify an item in receipt 792 that is going to be returned to enterprise 150. Register 140 may identify the item based on the identifier (block 1340). Register 140 may send a request to terminal 110 that asks terminal 110 to confirm the identity of the item to be returned. Terminal 110 may send a confirmation message, e.g., by entering information into terminal 110 via a keypad.

Register 140 may process the identified item to return the item to enterprise 150 (block 1350). For example, register 140 may mark the identified item as "returned" on receipt 792 and may credit the cost of the identified item onto receipt 792.

Register 140 may send a credit to terminal 110 (block 1360). For example, register 140 may contact a credit card issued related to receipt 792. Register 140 may credit an amount equal to the cost of the identified item to a credit card used to purchase the identified item. Register 140 may receive a credit confirmation from the credit card issuer. Register 140 may send the credit confirmation to terminal 110 via the near field link.

Register 140 may send updated transaction information to terminal 110 and/or server 130 (block 1370). For example, register 140 may generate an updated receipt that shows the return of the identified item and a credit to the credit card. Register 140 may send the updated receipt to terminal 110 and/or server 130. Terminal 110 may store the updated receipt in storage 420 and/or may send the updated receipt to server 130. Server 130 may store the updated receipt in transaction information 353 on behalf of terminal 110.

Exemplary implementations may be implemented in forms other than those described above. For example, assume that a university issues students smart cards (i.e., cards having logic therein to identify the student possessing the card). Further assume that students use the cards to identify themselves (e.g., via a picture or logic in the card) and to make purchases on campus. For example, a student may purchase a pizza by using his/her smart card and by signing his/her social security number to validate that the student using the card is the rightful possessor of the card. The university may determine that it is not in the students' interests to be writing social security numbers on receipts that carry the students' names and may possibly include other identifying information, such as a phone number or address, as these types of information may lead to identity theft.

Implementations may incorporate smart card information into a wireless device (e.g., a cell phone or wireless PDA) via code (e.g., software). Students may use their cell phones to gain access to buildings, identify themselves at university facilities (e.g., the cafeteria and/or library), and/or identify themselves at off campus (e.g., a subway terminal). In addition, the students may use their cell phones to perform secure near field transactions with merchants, such as a pizza delivery service, without having to write personally identifying information. For example, an employee of the pizza delivery service may carry a mobile terminal that establishes a secure session with a student's cell phone. For example, the secure session may be established via Bluetooth, RFID, and/or other techniques. The two devices may exchange identity and/or transaction information when the secure near field session is established therebetween. The student may send payment to the cell phone of the pizza delivery person and may enter a PIN via his/her cell phone keypad to complete the transaction (e.g., sending payment to the destination device). The student's cell phone and the mobile terminal may each retain an electronic receipt of the transaction. Still other implementations may take other forms.

CONCLUSION

Implementations may allow for near field secure wireless transactions between a mobile terminal and a register.

In the preceding specification, the invention has been described with reference to specific exemplary embodiments thereof. It will, however, be evident that various modifications and changes may be made thereunto without departing from the broader spirit and scope of the invention as set forth in the claims that follow. The specification and drawings are accordingly to be regarded in an illustrative rather than a restrictive sense.

For example, implementations can be implemented using devices and configurations other than those illustrated in the figures and described in the specification without departing from the spirit of the invention. Devices and/or components may be added and/or removed from the implementations of FIGS. 1-6 depending on specific deployments and/or applications. Further, disclosed implementations may not be limited to any specific combination of hardware, software and/or firmware. In addition, while a series of acts has been described with respect to FIGS. 10-13 the order of acts in FIGS. 10-13 may be varied in other implementations. Moreover, non-dependent acts may be implemented in parallel.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A server comprising:
a memory to store instructions; and
a processor to execute the instructions to:
register a wireless device with a managed service,
provide authentication information to the wireless device for use in establishing an identity of the wireless device,
provide authorization information to a register on behalf of the wireless device to establish the identity to the register, where the identity, when valid, allows the wireless device to participate in a near field transactions via a secure near field communication session, with the register,
receive transaction information, associated with the near field transaction, from the register or the wireless device, the transaction information identifying a purchase activity, including one or more purchased items, between the register and the wireless device, the transaction information comprising identification information for at least one of the one or more purchased items, a quantity of the at least one of the one or more purchased items, a price for at least one of the one or more purchased items, and identification information for a store associated with the register, and
store the transaction information with transaction identification information, where the transaction identification information is used to recall the transaction information on behalf of the register or the wireless device.

2. The server of claim 1, where the processor is further to:
send at least one of a token, a password, personal identification number, a name, an address, a telephone number, a seed, a secure ID value, or code to the wireless device for use with the authentication information.

3. The server of claim 1, where the processor is further to provide a service to an enterprise that operates the register and a plurality of other registers.

4. The server of claim 1, where the server is operated by a communication provider.

5. The server of claim 1, where, when storing the transaction information, the processor is to execute the instructions to:

store the transaction information in a data structure comprising a first field to store information identifying a store from which an item was purchased, a second field to store information identifying a purchased item, a third field to store quantity information of a purchased item, a fourth field to store pricing information of a purchased item, a fifth field to store transaction identification information of a transaction associated with a purchase activity including one or more purchased items, and a sixth field to store a description of a purchased item.

6. A transaction device, comprising:

an interface to:

receive identity information from a handheld device via a near field communication link, send transaction information to the handheld device during a secure near field communication session, carried via the near field communication link, when the identity information is validated, receive payment for transaction items, from the handheld device, during the near field communication session, and send completed transaction information to a server for storage on the server; and a processing module to:

process the identity information, where the identity information identifies the handheld device, process an authorization related to the handheld device to validate the identity information, process the transaction items on behalf of the handheld device, generate the transaction information, process the payment, and produce the completed transaction information, the completed transaction information comprising an electronic receipt, identifying the transaction items, and including identification information for one or more of the transaction items, quantity information for each of the one or more transaction items, and pricing information for each of the one or more transaction items.

7. The transaction device of claim 6, where the processing module is to:

process at least one of a token, a personal identification number, a watermark, a name, an address, a phone number, a serial number, a secure ID value, a secure identification value (SIV), or code received from the handheld device as part of the identity information.

8. The transaction device of claim 6, where the interface is to:

initiate an exchange of information with the handheld device by sending a radio frequency identification (RFID) query to the handheld device over the near field communication link.

9. The transaction device of claim 6, where the interface is to:

send at least one of authentication information, authorization information, transaction information, completed transaction information, or other information to an enterprise.

10. The transaction device of claim 6, where the interface comprises:

a RFID reader to receive identity information from the handheld device.

11. The transaction device of claim 10, where the RFID reader is to:

activate radio frequency identification logic in the handheld device to cause the handheld device to transmit the identity information.

12. The transaction device of claim 6, where the interface is to:

detect a presence of the handheld device.

13. The transaction device of claim 6, where the interface is to:

receive a personal identification number from the handheld device, where the personal identification number augments the identity information to establish the identity of the handheld device.

14. The transaction device of claim 6, where the interface is to:

receive retrieved completed transaction information from the server, where the retrieved completed transaction information is related to the handheld device and the transaction information.

15. The transaction device of claim 6, where the interface is to:

send the completed transaction information to the server, where the completed transaction information is to be recalled by the transaction device when an item related to the completed transaction information is returned or exchanged on behalf of the handheld device.

16. The transaction device of claim 6, where the authorization or the completed transaction information is provided to the server via a managed service.

17. The transaction device of claim 6, where the transaction device is one of a plurality of registers operating in an enterprise.

18. A portable device, comprising:

first logic to:

provide a presence indication to a register, where the presence indication identifies that the portable device is proximate to a portion of the register, receive a query on behalf of the register requesting identifying information, provide the identifying information in response to receiving the query, receive transaction information from the register, via a near field link, when the identifying information is valid, where the transaction information identifies transaction items related to the portable device, the transaction information comprising identification information for at least one of the transaction items, quantity information for the at least one of the transaction items, pricing information for the at least one of the transaction items, and store location information for a store associated with the register, and send payment information to the register via the near field link;

second logic to:
: send the transaction information or payment information to a server, where the server stores the transaction information or the payment information on behalf of the portable device; and third logic to:
: store the transaction information, the payment information, or the identifying information.

19. The portable device of claim 18, where the first logic is to:
: provide the identifying information via a secure near field communication link.

20. The portable device of claim 18, where the second logic is to:
: receive at least one of a token, a personal identification number, a watermark, a name, an address, a phone number, a serial number, a secure ID value, a secure identification value (SIV), or code from the server for use as the identifying information.

21. The portable device of claim 18, where the third logic is to:
: display the transaction information on a display to mirror transaction information on a register display.

22. The portable device of claim 18, where the third logic is to:
: process retrieved transaction information received from the server, and
: display the retrieved transaction on a display.

23. The portable device of claim 18, where the first logic is to:
: receive information from a wireless device during a peer-to-peer transaction.

24. The portable device of claim 18, where the second logic is to:
: send at least one of the transaction information, the payment information, or other information to the server, where the server stores at least one of the transaction information, the payment information, or the other information on behalf of the portable device.

25. The portable device of claim 24, where the second logic is further to:
: send the transaction information, the payment information, or the other information to the server via a far field communication link.

26. A transaction device, comprising:

first logic to:
: sense a terminal,
: send a radio frequency identification (RFID) query to the terminal based on the sensing,
: receive identification information from the terminal in response to the query,
: send transaction information to the terminal during a purchase transaction, where the terminal displays the transaction information during the purchase transaction, and
: receive payment information from the terminal in response to a payment request related to the purchase transaction;

second logic to:
: send an authorization request to a sewer, where the authorization request includes a portion of the identification information,
: receive an authorization from the server indicating that the identity is valid when the identification information matches stored identification information,
: send the transaction information and the payment information to a destination device, and
: receive stored transaction information or payment information from the destination device; and third logic to:
: process transaction items related to the terminal during the purchase transaction,
: generate the transaction information, the transaction information comprising identification information for at least one of the processed transaction items, a quantity for the at least one of the processed transaction items, a price for the at least one of the processed transaction items, and identification information for a store associated with the transaction device,
: display the transaction information on a display device, and
: process the stored transaction information or the payment information during a return transaction.

\* \* \* \* \*